(12) United States Patent
Chou et al.

(10) Patent No.: US 10,747,540 B2
(45) Date of Patent: Aug. 18, 2020

(54) HYBRID LOOKAHEAD BRANCH TARGET CACHE

(71) Applicant: Oracle International Corporation, Redwood City, CA (US)

(72) Inventors: Yuan Chou, Los Gatos, CA (US); Manish Shah, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 15/340,106

(22) Filed: Nov. 1, 2016

(65) Prior Publication Data

US 2018/0121200 A1    May 3, 2018

(51) Int. Cl.
*G06F 9/38*    (2018.01)

(52) U.S. Cl.
CPC .......... *G06F 9/3804* (2013.01); *G06F 9/3806* (2013.01); *G06F 9/3808* (2013.01)

(58) Field of Classification Search
CPC .... G06F 9/30058; G06F 9/3804; G06F 9/322; G06F 9/3806; G06F 9/3808; G06F 9/30054; G06F 9/30061; G06F 9/3844; G06F 9/3846; G06F 9/3848
See application file for complete search history.

(56) References Cited

U.S. PATENT DOCUMENTS

| | | | |
|---|---|---|---|
| 5,163,140 A | 11/1992 | Stiles | |
| 6,119,222 A | 9/2000 | Shiell | |
| 6,279,105 B1 * | 8/2001 | Konigsburg | G06F 9/3806 712/238 |
| 6,651,162 B1 * | 11/2003 | Levitan | G06F 9/3806 712/206 |
| 6,732,260 B1 * | 5/2004 | Wang | G06F 9/3806 712/207 |
| 7,827,392 B2 * | 11/2010 | Smith | G06F 9/3806 712/238 |
| 2002/0194461 A1 | 12/2002 | Henry | |
| 2002/0199091 A1 * | 12/2002 | Tago | G06F 9/3806 712/240 |
| 2005/0268076 A1 * | 12/2005 | Henry | G06F 9/30058 712/239 |
| 2006/0200655 A1 | 9/2006 | Smith | |
| 2007/0005938 A1 | 1/2007 | Grandou | |

(Continued)

*Primary Examiner* — Michael J Metzger
(74) *Attorney, Agent, or Firm* — Kowert, Hood, Munyon, Rankin & Goetzel, P.C.

(57) ABSTRACT

An apparatus is disclosed, the apparatus including a branch target cache memory configured to store one or more entries. Each entry of the one or more entries may include an address tag and a corresponding target address. The apparatus may also include a control circuit configured to check for at least one taken branch instruction in a group of one or more instructions fetched using a current address. The control circuit may be further configured to generate an address tag corresponding to the group of one or more instructions using another address used prior to the current address in response to a determination that the group of one or more instructions includes a taken branch instruction. In addition, the control circuit may be configured to store the corresponding address tag and a target address associated with the taken branch instruction in a particular entry in the branch target cache memory.

20 Claims, 8 Drawing Sheets

(56) References Cited

U.S. PATENT DOCUMENTS

| | | | | |
|---|---|---|---|---|
| 2008/0040591 A1* | 2/2008 | Moyer | ............... | G06F 9/30058 |
| | | | | 712/238 |
| 2009/0198962 A1* | 8/2009 | Levitan | ............... | G06F 9/30094 |
| | | | | 712/205 |
| 2010/0031011 A1* | 2/2010 | Chen | ................... | G06F 9/3806 |
| | | | | 712/240 |
| 2010/0306515 A1* | 12/2010 | Al-Otoom | ............ | G06F 9/3848 |
| | | | | 712/240 |
| 2011/0016292 A1* | 1/2011 | McDonald | ........... | G06F 9/3844 |
| | | | | 712/208 |
| 2011/0264894 A1* | 10/2011 | Lin | ...................... | G06F 9/3806 |
| | | | | 712/238 |
| 2012/0290821 A1* | 11/2012 | Shah | .................. | G06F 9/3806 |
| | | | | 712/240 |
| 2014/0006752 A1* | 1/2014 | Morrow | ............... | G06F 9/3806 |
| | | | | 712/205 |
| 2014/0122846 A1* | 5/2014 | Vasekin | .............. | G06F 9/3806 |
| | | | | 712/207 |
| 2017/0315810 A1* | 11/2017 | Eickemeyer | ........ | G06F 9/30058 |

* cited by examiner

200

| | | Fetch Cycle 201 | | | | | | |
|---|---|---|---|---|---|---|---|---|
| | | 201a | 201b | 201c | 201d | 201e | 201f | 201g |
| Fetch Stage 202 | 202a | A1 BTC look | A2 BTC look | A3 BTC look | A4 BTC look | TA3 BTC look | TA4 BTC look | TA5 BTC look |
| | 202b | | A1 BTC miss | A2 BTC miss | A3 BTC hit | A4 flush | TA3 BTC miss | TA4 BTC miss |
| | 202c | | | A1 | A2 | A3 | A4 flush | TA3 |
| | 202d | | | | A1 | A2 | A3 | |

| | | Fetch Cycle 301 | | | | | | |
|---|---|---|---|---|---|---|---|---|
| | | 301a | 301b | 301c | 301d | 301e | 301f | 301g |
| Fetch Stage 302 | 302a | A1 BTC look | A2 BTC look | A3 BTC look | TA3 BTC look | TA4 BTC look | TA5 BTC look | TA6 BTC look |
| | 302b | | A1 BTC miss | A2 LA hit | A3 BTC miss | TA3 BTC miss | TA4 BTC miss | TA5 BTC miss |
| | 302c | | | A1 | A2 | A3 | TA3 | TA4 |
| | 302d | | | | A1 | A2 | A3 | TA3 |

*FIG. 3*

| BTC memory 400 | | |
|---|---|---|
| LA bits 401 | address tags 402 | target addresses 403 |
| LA '0' 404a | fetch address 404b | target address 404c |
| LA '1' 405a | early fetch address 405b | target address 405c |
| LA '0' 406a | fetch address 406b | target address 406c |
| LA '1' 407a | early fetch address 407b | target address 407c |
| LA '0' 408a | fetch address 408b | target address 408c |

FIG. 4(a)

| BTC memory 400 | | |
|---|---|---|
| LA bit 401 | fetch addresses 402 | target addresses 403 |
| LA '0' 404a | fetch address 404b | target address 404c |
| LA '0' 405a | fetch address 405d | target address 405e |
| LA '0' 406a | fetch address 406b | target address 406c |
| LA '1' 407a | early fetch address 407d | target address 407c |
| LA '0' 408a | fetch address 408b | target address 408c |

FIG. 4(b)

HYBRID LOOKAHEAD BRANCH TARGET CACHE

BACKGROUND

Field of the Invention

The embodiments described herein relate to program flow control in processors and, more particularly, to a method for predicting branch addresses.

Description of the Related Art

Some processing cores include branch prediction circuits to improve performance by determining if a most recently fetched group of instructions includes one or more branch instructions. Branch prediction circuits may also be used to predict a direction and a target address of each included branch instruction in the group. The target address of a first taken branch instruction in the group is then selected to be the fetch address for the next group of instructions to be fetched from the instruction cache. As used herein, a "taken branch instruction" or "taken branch" refers to a branch instruction that is predicted to take a corresponding branch direction rather than move to a subsequent, contiguous memory address.

Determining the target address for the first taken branch instruction may utilize several processor cycles. Under some conditions, using these cycles to determine the target address may reduce the performance of the processor by stalling further instruction fetches until the target address is determined. A Branch Target Cache may be employed in some processing cores to reduce the number of cycles used to determine the target address by caching previously used target addresses.

SUMMARY

Various embodiments of a system, a method and an apparatus are disclosed in which the apparatus may include a branch target cache configured to store one or more entries. Each entry of the one or more entries may include an address tag and a corresponding target address. The apparatus may also include a control circuit configured to check for at least one branch instruction in a group of one or more instructions fetched using a current address. The control circuit may also be configured to generate an address tag corresponding to the group of one or more instructions using another address used prior to the current address in response to a determination that the group of one or more instructions includes a branch instruction. Furthermore, the control circuit may also be configured to store the corresponding address tag and a target address associated with the branch instruction in a particular entry in the branch target cache memory.

In a further embodiment, the control circuit may be further configured to generate the corresponding address tag using the another address in response to a determination that a number of taken branch instructions occurring over a period of time is greater than a threshold value. The control circuit may be otherwise configured to generate the corresponding address tag using the current address.

In another embodiment, to determine that the number of taken branch instructions occurring over the period of time is greater than the threshold value, the control circuit may be further configured to initialize a count value to a starting value at the start of a time period. The control circuit may also be configured to increment the count value in response to the determination that the group of one or more instructions includes a taken branch instruction, and to compare the count value to the threshold value at the end of the time period.

In one embodiment, the control circuit may be further configured to generate the corresponding address tag using the another address in response to a determination that the count value was greater than the threshold value at the end of a most recent time period. In another embodiment, the particular entry in the branch target cache memory may include a type bit whose value indicates whether the corresponding address tag was generated using the another address or the current address.

In a further embodiment, the control circuit may be further configured to determine that an entry corresponding to the group exists in the branch target cache memory. The control circuit may be additionally configured to generate a replacement address tag using the another address in response to a determination that the count value was greater than the threshold value at the end of a most recent time period and that the type bit in the address tag of the corresponding entry indicates that the current address was used to generate the corresponding address tag. In one embodiment, the control circuit may be further configured to generate the corresponding address tag using the current address in response to a determination that the group of one or more instructions was an initial group of one or more instructions fetched subsequent to a branch misprediction.

BRIEF DESCRIPTION OF THE DRAWINGS

The following detailed description makes reference to the accompanying drawings, which are now briefly described.

FIG. 2 shows an embodiment of groups of program instructions in an instruction fetch pipeline.

FIG. 3 shows another embodiment of groups of program instructions in an instruction fetch pipeline.

FIG. 4 includes two illustrations. FIG. 4(a) shows a first state of a Branch Target Cache. FIG. 4(b) shows a second state of the Branch Target Cache.

Figure 1:
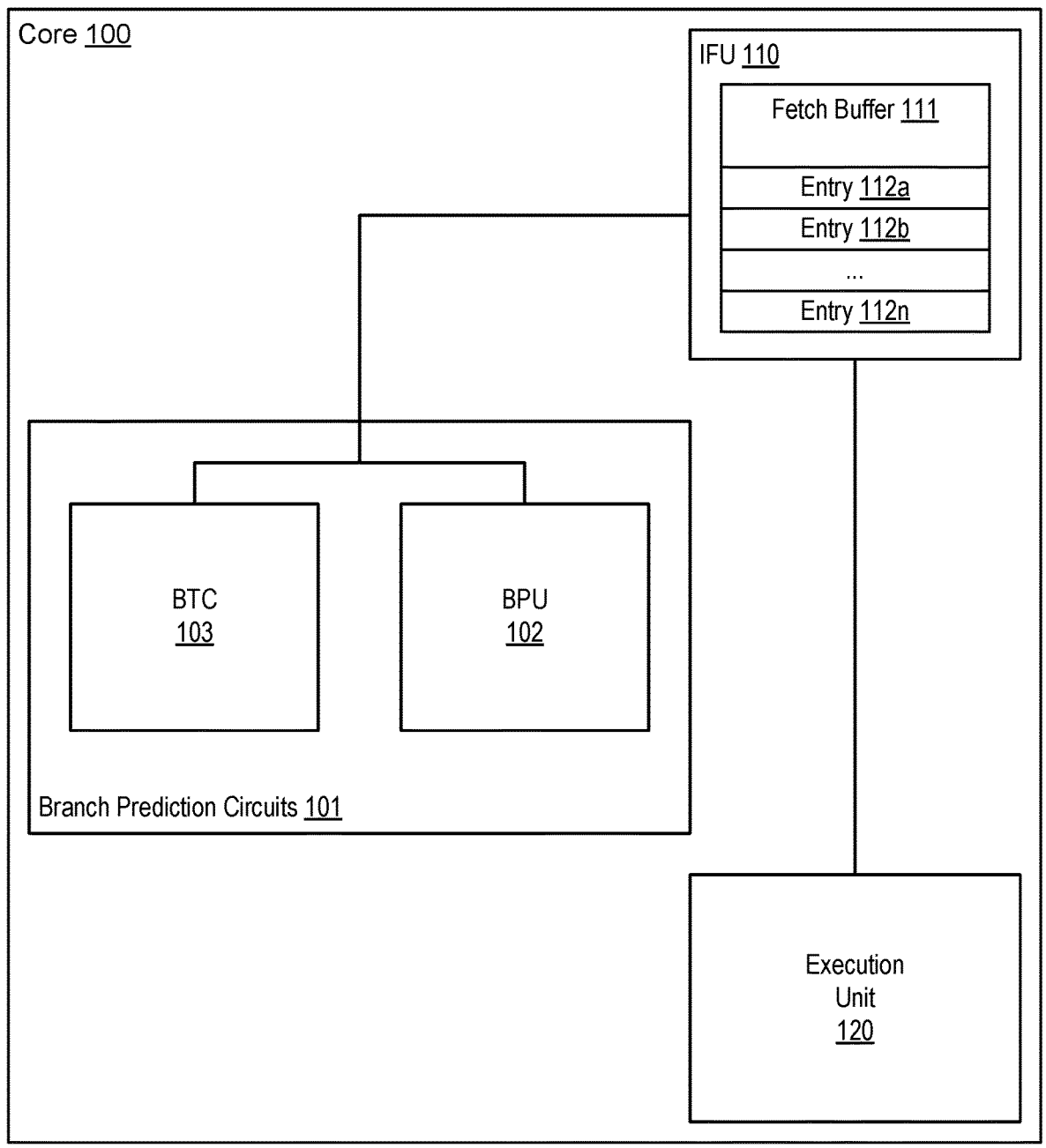
FIG. 1 illustrates a block diagram of an embodiment of a processing core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a processing core (or simply, a "core") may refer to a unit of a processor that is capable of executing program instructions and processing data independently of other processing cores within the processor, such that multiple cores may execute instructions concurrently. Performance of a processing core may be impacted by a multitude of factors, including processor clock speed, a number of cores included in the processor, and speed of the memory accesses. One method for improving performance is to fetch and buffer instructions for execution so that the instructions are decoded and ready to execute when an execution unit in the core gets to the instruction. Branch instructions, however, may complicate an instruction fetch, as they may redirect program flow to an associated target address. At least some branch instructions may be conditional, in which they either take a branch to the target address or continue with a contiguous program flow to a following instruction dependent upon one or more conditions of the core at the time of execution of the branch instruction. Since the condition at the time of execution is not known, a prediction may be made as to whether the branch instruction will be taken or not.

In addition, some cores may fetch instructions in groups of multiple instructions. While fetching groups of instructions may provide a performance benefit by filling an instruction queue faster, this performance benefit may be diminished when a branch instruction causes program execution to deviate from a current series of instructions. Instructions fetched after the branch instruction may be flushed, resulting in wasted effort involved in the fetching of these instructions. It is noted, that as used herein, to "flush" or "flushing" one or more instructions refers to removing or invalidating the one or more instructions from a fetch buffer and/or instruction queue.

Branch prediction circuits may be used to track branch instructions, collecting a history of fetched and executed branch instructions. Branch prediction circuits may also indicate if a group of fetched instructions associated with a given address (referred to herein as a "fetch group") includes a branch instruction. If a branch instruction is indicated as part of the fetch group, then the next fetch operation may use the target address. While branch prediction may help improve a core's performance, the prediction process can take multiple processing cycles to determine, in response to a prediction that a branch instruction is included, a target address. In some circumstances, the branch prediction may fall behind an execution unit's ability to execute instructions, and reduce instruction throughput. To improve the speed for determining a target address, some processing cores may include a branch target cache (BTC). A BTC stores branch target addresses for fetch addresses that have been identified as including branch instructions. Even a BTC may use multiple processor cycles to produce a target address, and, therefore, result in wasted cycles used to fetch instructions while waiting for the target address, if these fetched instructions are later flushed.

A process for reducing a time to identify fetch groups including branch instructions and producing a corresponding target address is desired. Embodiments for systems and methods for tracking and identifying fetch groups including branch instructions are presented herein.

It is noted that, as used herein, an "issued," "issuing," or to "issue" an instruction refers to selecting an instruction to be executed by a processing core. In a processing core that only supports in-order execution, issuing may consist of selecting a next instruction in a series of instructions. In a processing core that allows out-of-order processing, the core may include circuitry that selects an instruction to be issued ahead of a previously received instruction if the previously received instruction is stalled (e.g., cannot start or complete execution due to a resource limitation). In the embodiments presented herein, out-of-order processing of instructions is permitted.

A block diagram of an embodiment of a processing core is illustrated in FIG. 1. In the illustrated embodiment, core 100 includes branch prediction circuits 101 coupled to instruction fetch unit (IFU) 110, which is, in turn, coupled to execution unit 120. Branch prediction circuits 101 include branch prediction unit (BPU) 102 and branch target cache (BTC) 103. IFU 110 includes fetch buffer 111.

In the illustrated embodiment, branch predictions circuits 101 are used to predict branch instructions and/or target addresses for fetch operations. BPU 102 includes logic circuits to track if a fetch group includes a branch instruction, and if executed branch instructions take their respective branches or not. BPU 102 may use a branch history table to track a number of times a branch instruction is taken versus how often the branch is not taken. BPU 102 may also track patterns of taking or not taking a particular branch. Using the data collected in the history table, BPU 102 determines prediction value indicating if a given branch will be taken or not. BPU 102 may also determine a target branch address when a given fetch group is identified as including a branch instruction.

Although BPU 102 may determine a target address for a predicted taken branch, the time for determining the target address may cause wasted cycles in a fetch pipeline of core 100. To mitigate these wasted cycles, branch prediction circuits 101 may use BTC 103 to cache previously used target addresses. If an address of a fetch group has a corresponding entry in BTC 103 (a BTC "hit"), then fetch operations may continue using a target address included in the corresponding entry. If a corresponding entry is not found for the address of the fetch group (a BTC "miss"), then program fetches will continue dependent upon a result from BPU 102.

BPU 102 may operate in parallel with BTC 103. BTC 103 may retrieve a cached target address before BPU 102 and determine a predicted target address, and fetch operations may proceed with the cached target address. Upon BPU 102 determining the target address for a given fetch group, a control circuit in branch prediction circuits 101 may compare the predicted target address from BPU 102 to the cached target address from BTC 103. If the two addresses match, then fetch operation may continue using the cached target address. If there is a mismatch, however, then any instructions fetched using the cached target address are flushed (i.e., discarded or invalidated) and instruction fetching restarts using the predicted target address from BPU 102.

Instruction fetch unit (IFU) 110 may be configured to retrieve instructions for execution in core 100. In the illustrated embodiment, IFU 110 performs various operations relating to the fetching of instructions from cache or memory, and the decoding of instructions prior to the instructions being issued for execution. Instruction fetch unit 110 includes fetch buffer 111 to store fetched instructions before they are sent to execution unit 120. In various embodiments, IFU 110 may fetch a single instruction or multiple instructions per fetch operation. A group of one or more instructions retrieved in a single fetch operation may be referred to as a "fetch group." Fetch buffer 111 includes entries for fetch groups 112a-112n, which may correspond to any suitable number of fetch group entries.

In one embodiment, IFU 110 is configured to maintain a pool of fetched, ready-for-issue instructions to be executed by core 100. IFU 110 may receive branch predictions and/or corresponding target addresses from branch prediction circuits 101 after a fetch group including a branch instruction has been fetched and stored in one of fetch group entries 112. These target addresses are used for further instruction fetches. Upon a determination that a branch direction has been mispredicted, IFU 110 may flush one or more entries 112 from fetch buffer 111, and restart instruction fetches following the mispredicted branch instruction using an address value determined from the execution of the branch instruction.

Execution unit 120 may be configured to process and provide results for instructions issued from IFU 110. In some embodiments, execution unit 120 may be configured to execute certain integer-type instructions defined in the implemented ISA, such as arithmetic, logical, and shift instructions, while other instructions, such as, for example, floating point arithmetic instructions may be executed by a coprocessor, such as a floating point unit (not shown). It is contemplated that in some embodiments, core 100 may include more than one execution unit 120, and each of the execution units may or may not be symmetric in functionality.

It is noted that FIG. 1 is merely an example of a processing core. For clarity, the processing core of FIG. 1 has been simplified to shown only circuit blocks related to the disclosed concepts. In other embodiments, core 100 may include additional circuit blocks, such as, for example, multiple execution units and/or one or more coprocessing units (e.g., a floating point unit or a cryptography accelerator).

Turning to FIG. 2, an embodiment of groups of program instructions in an instruction fetch pipeline is illustrated. Fetch pipeline 200 is a tabular representation of the flow of instructions in various fetch groups through a fetch pipeline that may be included in a processing core, such as, for example, core 100 in FIG. 1. Seven fetch cycles 201 are shown, cycles 201a-201g, with four fetch stages 202 shown for each fetch cycle 201, including stages 202a-202d. In the illustrated embodiment, an address for each fetch group is used to access a branch target cache, such as, for example, BTC 103, to determine if a corresponding entry has previously been generated.

In the first illustrated fetch cycle 201a, instructions comprising fetch group A1 are retrieved from a system memory and placed in fetch stage 202a. An address used to fetch group A1 is used to look for a corresponding entry in a BTC, such as, for example, BTC 103. The process of looking for an entry in a BTC is referred to, herein as a "BTC lookup." In fetch cycle 201b, fetch group A2 is retrieved and placed in fetch stage 202a while fetch group A1 is moved into fetch stage 202b. BTC 103 indicates a BTC "miss" (i.e., no corresponding entry is found) for the address of group A1 and starts a BTC lookup using the address of group A2. In fetch cycle 201c, fetch group A3 is retrieved while fetch groups A1 and A2 are respectively moved into fetch stages 202c and 202b. BTC 103 indicates a miss for the address of group A2 and initiates a BTC lookup for group A3.

In fetch cycle 201d, fetch group A4 is retrieved into fetch stage 202a. Fetch groups A1, A2, and A3 are each advanced into fetch stages 202d, 202c, and 202b, respectively. An address used to fetch group A3 registers a BTC "hit," i.e., an address tag in BTC 103 is determined to correspond to the address. A bit in the address tag, referred to herein as a "look-ahead bit," is read to determine if the BTC entry corresponding to the address tag is associated with the fetch group A3 or fetch group A4. In this example, the look-ahead bit indicates that the BTC entry is associated with fetch group A3. Fetch group A3, therefore, is predicted to include a taken branch instruction, and a target address for the branch instruction is read from a BTC entry corresponding to the address of group A3. The read target address is sent to an instruction fetch unit, such as, e.g., IFU 110, to use as an address for the next fetch group. Since program flow is predicted to move from the instructions of fetch group A3 to instructions at the target address, the instructions of fetch group A4, currently in fetch stage 202a, are not needed and are scheduled to be flushed in the next fetch cycle, 201e. If a BTC lookup has started for fetch group A4, then it may be aborted, in other embodiments, the BTC hit for group A3 may cancel the BTC lookup for group A4 before it begins.

In fetch cycle 201e, the target address is used to fetch group TA3 into fetch stage 202a. Instructions in fetch group A4 start to be flushed from the fetch pipeline in stage 202b, while fetch groups A2 and A3 are advanced into stages 202d and 202c, respectively. A BTC lookup is started for group TA3. In fetch cycle 201f, fetch group TA4 is retrieved from an address following the target address, and group TA4 is placed in fetch stage 202a. Group TA3 is advanced into fetch stage 202b. Any instructions remaining from fetch group A4 are flushed from fetch stage 202c, and fetch group A3 is advanced into stage 202d. BTC 103 indicates a BTC miss for group TA3 and starts a lookup for group TA4. Continuing into cycle 201g, fetch group TA5 is retrieved into fetch stage 202a, while fetch groups TA3 and TA4 are advanced into stages 202c and 202b, respectively. BTC 103 indicates a miss for group TA4 and initiates a BTC lookup for group TA5. Fetch stage 202d may be empty due the flushing of group A4 from the pipeline.

It is noted that fetch group A4 is retrieved in the same fetch cycle that a BTC hit is determined for group A3. Due to this overlap, IFU 110 fetches the instructions of group A4 before BTC 103 can determine that group A3 includes a branch instruction and the instructions of group A4 won't be used at this time. This results in wasted cycles used to retrieve and then flush the instructions of fetch group A4.

It is also noted that FIG. 2 is one example of an operation of an instruction fetch pipeline. Table 200 is intended as a visual representation of a flow of groups of instructions through an instruction fetch pipeline. Although instructions are referred to as "moving" or "advancing" through the pipeline, the instructions may remain in an initial buffer location associated with the pipeline while the corresponding buffer address may be associated with the various pipeline stages.

Moving to FIG. 3, another embodiment of groups of program instructions in an instruction fetch pipeline is shown. Fetch pipeline 300, similar to fetch pipeline 200 above, is a tabular representation of the flow of instructions in various fetch groups through a fetch pipeline that may be included in a processing core, such as, for example, core 100 in FIG. 1. As before, seven fetch cycles 301 are shown, cycles 301a-301g, with four fetch stages 302 shown for each fetch cycle 301, including stages 302a-302d. As presented for FIG. 2, an address for each fetch group is used to access a branch target cache, such as, for example, BTC 103, to determine if corresponding BTC entries exist.

In fetch cycle 301*a*, fetch group A1 is retrieved into fetch stage 302*a*. An address for fetch group A1 is used to for a BTC lookup in BTC 103. In fetch cycle 301*b*, fetch group A2 is retrieved and placed in fetch stage 302*a* while fetch group A1 is moved into fetch stage 302*b*. BTC 103 indicates a BTC miss for fetch group A1 and starts a BTC lookup for fetch group A2.

In the illustrated example, in fetch cycle 301*c*, fetch group A3 is retrieved while fetch groups A1 and A2 are respectively moved into fetch stages 302*c* and 302*b*. BTC 103 indicates a hit for the address of group A2. The look-ahead bit in the corresponding address tag for the hit entry indicates that the entry is associated with fetch group A3, which is currently being fetched in to fetch stage 302*a*. Fetch Group A3 is, therefore, predicted to include a taken branch instruction, as determined by the BTC lookup using the address of fetch group A2. Such a BTC lookup is referred to as a look-ahead BTC entry, in which a target address is read from the look-ahead entry and sent to an instruction fetch unit, such as, e.g., IFU 110, to use as an address for the next fetch group. Meanwhile, the address of fetch group A3 is used to initiate a next BTC lookup.

In fetch cycle 301*d*, the target address acquired in cycle 301*c* is used to retrieve fetch group TA3. Fetch groups A1, A2, and A3 are each advanced into stages 302*d*, 302*c*, and 302*b*, respectively. The BTC lookup using the address of fetch group A3 results in a BTC miss and a BTC lookup is initiated for fetch group TA3. In fetch cycles 301*e* through 301*g*, instructions are fetched for fetch groups TA4, TA5, and TA6, respectively while groups A2, A3, and TA3 are advanced through the fetch stages 302*b* through 302*g*.

It is noted, that no fetch group is flushed in the illustrated example. Since the branch instruction in fetch group A3 is predicted using the address of fetch group A2, IFU 110 is able to receive the branch target address before a consecutive address after fetch group A3, e.g., an address for group A4, is used for the fetch operation after fetch group A3 is retrieved. No wasted cycles, therefore, are spent retrieving and then flushing instructions fetched inadvertently.

It is also noted that FIG. 3 is merely an example of an operation of an instruction fetch pipeline. Table 300, like table 200 above, is intended as a visual representation of a flow of groups of instructions through an instruction fetch pipeline. In various embodiments, an instruction fetch pipeline may include any suitable number of pipeline stages as well as any number of fetch cycles.

Turning now to FIG. 4, two embodiments of a branch target cache memory are illustrated. FIG. 4(*a*) shows branch target cache memory (BTC memory) 400 in a first state, while FIG. 4(*b*) shows BTC memory 400 in a second, subsequent, state. In the illustrated embodiment, BTC memory 400 corresponds to a memory of a branch target cache circuit, such as, for example, BTC 103 in FIG. 1. BTC memory 400 includes three columns, look-ahead bits (LA bits) 401, address tags 402, and target addresses 403. Each row, enumerated 404 through 408, represents one BTC entry. Although five BTC entries are shown, any suitable number of BTC entries may be included in various embodiments.

FIG. 4(*a*) illustrates a first state of BTC memory 400. Five BTC entries, 404-408, have been generated. BTC entries 404, 406, and 408 include values for LA bits 404*a*, 406*a*, and 408*a* that are set to '0' to indicate that they are standard entries, and not look-ahead entries. Accordingly, address tags for these three BTC entries are generated using fetch addresses that are associated with the fetch group that includes a branch instruction that initiates the generation of the corresponding BTC entry. For example, BTC entry 404 includes an address tag 402 that is generated using fetch address 404*b*. Fetch address 404*b* is, in the illustrated embodiment, has previously been used to fetch a group of instructions that includes a branch instruction, thereby initiating the generation of BTC entry 404. Target address 404*c* is also included in BTC entry 404 and corresponds to the target address for the branch instruction included in the group of instructions. Similarly, BTC entries 406 and 408 include address tags generated from fetch address 406*b* and fetch address 408*b*, respectively, in addition to target addresses 406*c* and 408*c*.

It is noted that the address tags 402 may not correspond directly to the fetch addresses used to generate the address tags. In some embodiments, to reduce a size of BTC memory 400, address tags are generated with a fewer number of bits than are used in the address. For example, a given processing core may utilize a 32-bit address value. A BTC used in the given processing core may utilize an 8-bit or 16-bit value for the corresponding address tag. The reduced size of the address tags may reduce a size of a memory array used to implement the BTC memory, which, in turn, may reduce a BTC lookup time. The smaller address tag, however, may also result in a lower accuracy for predicting branch instructions since each value of an address tag may correspond to more than one address value.

FIG. 4(*a*) also includes BTC entries 405 and 407, which include LA bits 405*a* and 407*a*, respectively, both of which are set to a value of '1' to indicate that the BTC entries are look-ahead entries. As look-ahead entries, address tags 402 use early fetch addresses 405*b* and 407*b*, respectively. Early fetch addresses 405*b* and 407*b* are addresses used for retrieving respective groups of instructions fetched before the groups of instructions that includes the branch instruction. In other words, target addresses 405*c* and 407*c* correspond to fetch groups that are retrieved after the fetch groups retrieved with early fetch address 405*b* and early fetch address 407*b*.

FIG. 4(*b*) illustrates how a BTC entry may be converted from a look-ahead BTC entry to a standard BTC entry. A look-ahead BTC entry may be converted to a standard BTC entry if a target address received from a branch prediction circuit, such as, e.g., BPU 102, does not match the target address from the BTC entry. Using BTC entry 405 as an example, BTC 103 generates a BTC hit after a BTC lookup initiated when instructions are fetched using early fetch address 405*b*. The instruction fetch circuit (e.g., IFU 110) retrieves a next fetch group using an address subsequent to early fetch address 405*b*. In this example, the subsequent address is fetch address 405*d*. IFU 110 receives target address 405*c* in response to the BTC hit and, after instructions are fetched using fetch address 405*d*, IFU 110 uses target address 405*c* for a next fetch operation.

In parallel to the operations of BTC 103, BPU 102 determines a branch prediction for the fetch group associated with fetch address 405*d* and a corresponding target address. BTC 103 may return the BTC hit and send target address 405*c* to IFU 110 before BPU 102 determines the prediction, allowing IFU 110 to continue to retrieve the next fetch group using target address 405*c*. Upon BPU 102 determining the prediction, a control circuit in branch prediction circuits 101 compares the prediction of BPU 102 to the BTC hit and target address 405*c*. If BPU 102 determines that the fetch group associated with fetch address 405*d* does not have a branch instruction, then BTC entry 405 may be invalidated. This may occur if a fetch group including a branch instruction has a fetch address different from fetch address 405*d*, but still corresponds to the same address tag. If, however, BPU 102 determines that the fetch group associated with fetch address 405*d* does have a branch instruction and produces a corresponding target address (target address 405*e*), the target address 405*e* is compared to target address 405*c*. If the two target address match, then instruction fetching continues as described above in regards to FIG. 3. Otherwise, if the two target addresses do not match, then target address 405*e* is sent to IFU 110 and all instruction fetched using target address 405*c* are flushed. In some embodiments, BTC entry 405 may be updated as a standard BTC entry using an address tag 402 based on fetch address 405*d* and using target address 405*e*. In other embodiments, BTC entry 405 may be invalidated.

It is noted that the embodiments of BTC memory 400 in FIG. 4 are merely examples to demonstrate operation of a branch target cache. Variations of the illustrated elements of FIG. 4 are contemplated. For example, in other embodiments, any suitable number of BTC entries may be included. The illustrated memories are not intended to imply a physical arrangement of data, merely a logical representation.

Figure 5:
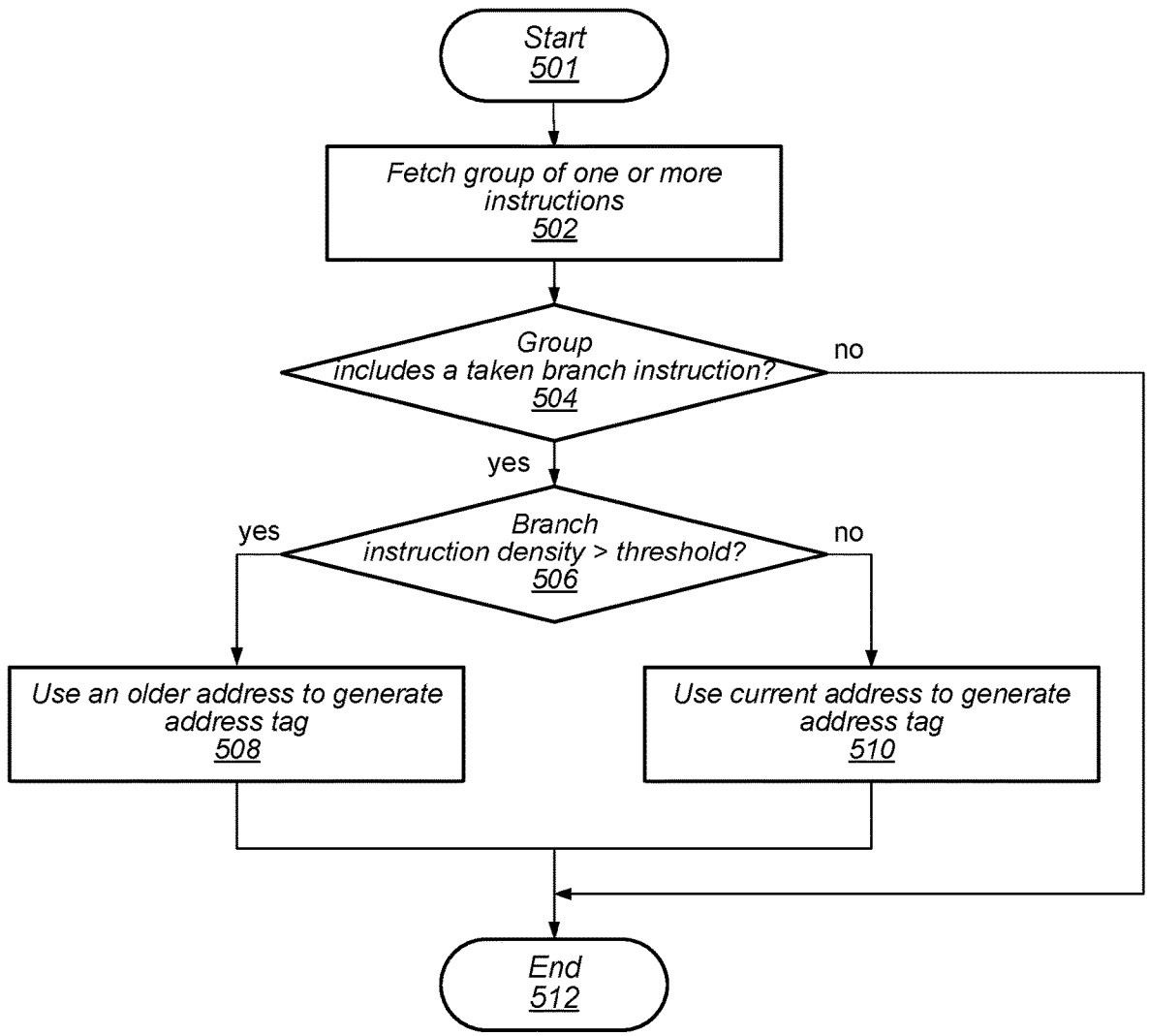
FIG. 5 illustrates a flow diagram of an embodiment of a method for generating an entry in a Branch Target Cache.

Moving now to FIG. 5 a flow diagram of an embodiment of a method for generating an entry in a Branch Target Cache is shown. The operations of method 500 may be applicable to a processing core, such as, for example, core 100 in FIG. 1. Referring collectively to FIG. 1 and the flowchart of FIG. 5, the illustrated embodiment of the method begins in block 501.

A group of one or more instructions is fetched (block 502). An instruction fetch unit, such as, for example, IFU 110, retrieves a fetch group of one or more instructions using a fetch address corresponding to a memory location associated with at least one of the instructions. The fetch group may be stored in a buffer, such as, e.g., fetch buffer 111.

Further operations of Method 500 may depend on a determination if the fetch group includes a branch instruction (block 504). In the illustrated embodiment, the fetch group does not have a corresponding entry in a branch target cache, such as, for example, BTC 103. A BTC lookup for the fetch group results in a BTC miss. A branch instruction may be identified during an instruction decode operation by IFU 110 or other decode logic in core 100. Some branch instructions may always take their associated branch, while other branch instructions, referred to herein as "conditional branch instructions," may take their branch or not dependent upon a value of a register in core 100, such as, a condition code register, for example. A conditional branch instruction is indicated as taken if execution of the instruction results in the program flow taking the branch. If a taken branch instruction is identified, then the method moves to block 506 to determine a branch instruction density. Otherwise, the method ends in block 512.

Operations of the method may further depend on a determined branch instruction density (block 506). In the illustrated embodiment, logic included in BTC 103 or other logic in branch prediction circuits 101 determines a branch instruction density by tracking a number of branch instructions executions over a predetermined interval. The interval may, in various embodiments, correspond to a number of instruction cycles, a time period, or the like. In some embodiments, a new branch density may be determined for each interval, while in other embodiments, a rolling average may be used. An example method for determining a branch instruction density will be presented below. If the branch instruction density is above a threshold value, then the method moves to block 508 to create a look-ahead BTC entry. Otherwise, the method moves to block 510 to create a standard BTC entry.

If the most recently calculated branch instruction density is above the threshold, then an address for an older fetch group is used to generate an address tag (block 508). The older address, in the illustrated embodiment, is a fetch address corresponding to a fetch group retrieved prior to the current fetch group. The address tag is generated using at least a portion of the older address and may include using a hash value of the older address. As an example, the address tag may be created by performing an exclusive "OR" function between an upper portion and a lower portion of the older address. A look-ahead BTC entry is generated including the address tag, a look-ahead bit set to indicate the entry is a look-ahead entry, and a target address for the identified branch instruction. The look-ahead BTC entry is stored in BTC 103 and will generate a BTC hit the next time the fetch group associated with the older address is retrieved again. The method ends in block 512.

In some embodiments, additional conditions may be applied to determine if the BTC entry is generated as a look-ahead BTC entry. For example, if certain types of branch instructions, such as CALL and RETURN instructions, which may be associated with program subroutines, correspond to the identified branch instruction, then the BTC entry may be generated as a standard branch instruction, or a BTC entry may not be generated for the fetch group. Such instructions may be tracked by other types of branch prediction logic. In addition, if a taken branch instruction is the last instruction in a fetch group, then the BTC entry may be generated as a standard BTC entry. Furthermore, if the current fetch group is the first fetch group to be retrieved after a branch misprediction then the BTC entry for this fetch group may be generated as a standard BTC entry regardless if it otherwise qualifies to be a look-ahead BTC entry.

If the most recently calculated branch instruction density is not above the threshold, then a fetch address corresponding to the current fetch group is used to generate an address tag for a standard BTC entry for the current fetch group (block 510). The address tag is generated as described above and included in a standard BTC entry along with a look-ahead bit set to indicate the entry is a standard entry and a target address for the identified branch instruction. The standard entry is stored in BTC 103 and will generate a BTC hit the next time the current fetch group is retrieved. The method ends in block 512.

It is noted that the method illustrated in FIG. 5 is an example for demonstrating the disclosed concepts. In other embodiments, however, some operations may be performed in parallel or in a different sequence. Additional operations may be included in some embodiments.

Figure 6:
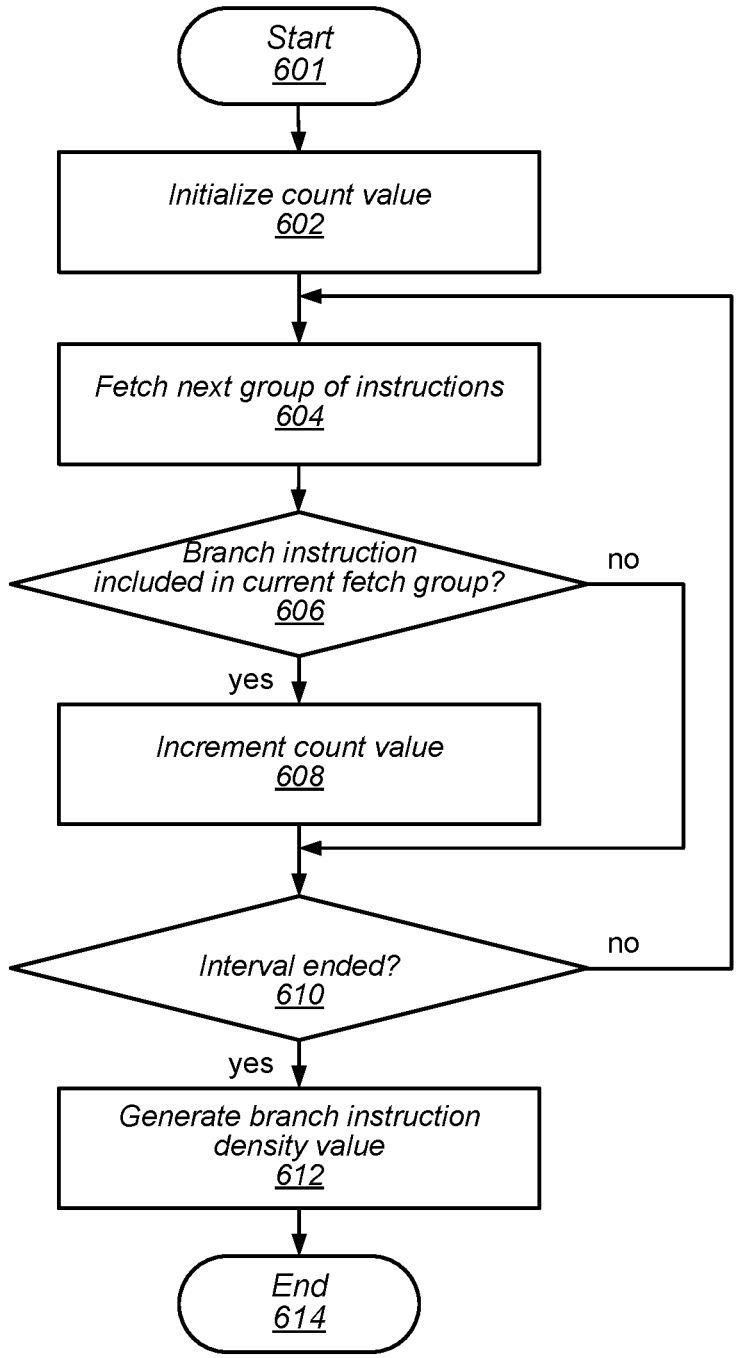
FIG. 6 is a flow diagram illustrating an embodiment of a method for determining a branch instruction density over a predetermined interval.

Turning to FIG. 6 a flow diagram illustrating an embodiment of a method for determining a branch instruction density over a predetermined interval is illustrated. Method 600 may be applied to a processing core, such as, for example, core 100 in order to update a branch target cache, such as, e.g., BTC 103, both in FIG. 1. Referring collectively to FIG. 1 and FIG. 6, method 600 begins in block 601.

At the start of an interval, a count value is initialized (block 602). In some embodiments, the interval may correspond to a number of processor cycles executed or fetch operations occurring in core 100. In other embodiments, the interval may correspond to a time period, tracked by a timer circuit. A count value is used to track a number of fetch groups that include a taken branch instruction. At the start of a given interval, the count value is initialized. In some embodiments, the initial value may correspond to a threshold value, and the count value is decremented for each occurrence of a fetch group with a taken branch instruction. In the illustrated embodiment, the count value is initialized to zero.

A group of instructions are fetched (block 604). IFU 110 retrieves a fetch group based on an address associated with at least one of the instructions. In some embodiments, BTC 103 may perform a BTC lookup using the address. Instructions in the fetch group are stored in a buffer, such as, fetch buffer 111, for example. The instructions may be decoded or pre-decoded, in some embodiments, while in fetch buffer 111. This decoding operation may be used to indicate a taken branch instruction in the fetch group.

Further operations of the method may depend on a determination if a branch instruction is included in the fetch group (block 606). Logic circuits in BTC 103 or in branch prediction circuits 101 determine if at least one instruction in the fetch group is identified as a taken branch instruction. If at least one instruction of the fetch group is identified as a taken branch instruction, then the method moves to block 608 to increment the count value. Otherwise, the method moves to block 610 to determine if the interval has ended.

If a taken branch instruction is identified in the fetch group, the count value is incremented (block 608). The logic circuits in BTC 103 or in branch prediction circuits 101 increment the count value in response to determining that the fetch group includes a taken branch instruction. In embodiments in which the count value is initialized to a threshold value and then decrement, the count value is decremented accordingly.

Continuing operations of method 600 may depend on a determination if the interval has ended (block 610). If the interval is time-based, then a timer circuit may assert a signal to indicate the end of a given time period. If the interval corresponds to a number of fetch operations of processor cycles, then the logic circuits in BTC 103 or in branch prediction circuits 101 may read a current count of the operations or cycles and compare to a limit for the interval. In various embodiments, the limit may be a fixed value or programmable via software executing in core 100 or another core coupled to core 100. If the interval has ended, then the method moves to block 612 to generate a branch instruction density value. If the interval has not ended, then the method returns to block 604 to retrieve instructions in a next fetch group.

If the interval has ended, then a branch instruction density value is generated (block 612). At the end of an interval, the count value is used to generate a branch instruction density value to be used by BTC 103 to determine if a BTC entry may be generated as a look-ahead BTC entry, such as described in block 506 of FIG. 5. In some embodiments, the branch instruction density value may correspond to the count value at the end of the interval and may be stored for use during the next interval. In other embodiments, the count value may be compared to a threshold value and one or more register bits may be set to indicate if the count value reached the threshold value or not. For example, a single register bit may be used and set to one if the count value reached the threshold and set to zero otherwise. The method ends in block 614.

It is noted that method 600 illustrated in FIG. 6 is an example embodiment. In other embodiments, operations may be performed in a different order than shown. Additional operations may be included in some embodiments.

Figure 7:
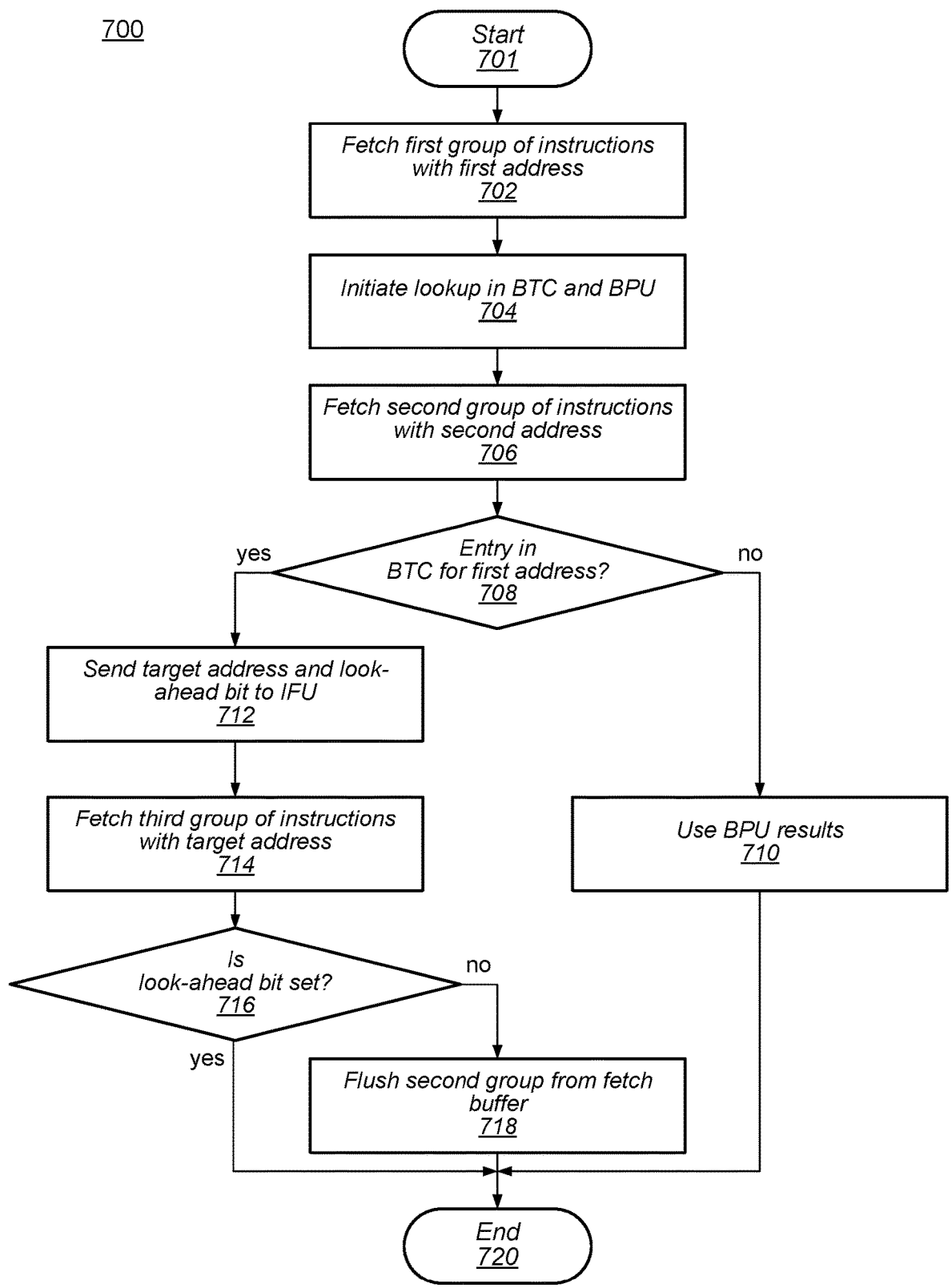
FIG. 7 shows a flow diagram of an embodiment of a method for fetching instruction groups including use of a branch target cache.

Moving to FIG. 7, a flow diagram illustrating an embodiment of a method for fetching instruction groups, including use of a branch target cache is shown. Method 700 may be applied to a processing core, such as, for example, core 100 in FIG. 1. Referring collectively to FIG. 1 and FIG. 7, method 700 begins in block 701.

A first group of instructions is fetched using a first address (block 702). IFU 110 retrieves instructions included in a first fetch group. The first address corresponds to at least one instruction in the first fetch group. The instructions are stored in a buffer such as fetch buffer 111.

A BTC lookup is initiated in parallel with a BPU prediction (block 704). A BTC lookup is performed using the first address. In some embodiments, a hash function may be utilized to generate an address tag for accessing a cache memory in BTC 103. In other embodiments, a portion of the first address may be used to generate the address tag. The address tag is compared to address tags corresponding to valid entries currently in BTC 103. The first address is also used by BPU 102 to initiate a prediction on branch instructions in the first fetch group as well as to predict a target address if a branch instruction is predicted. In some embodiments, the prediction by BPU 102 will take more time than the BTC lookup in BTC 103.

A second group of instructions is fetched using a second address (block 706). While the BTC lookup is being performed in BTC 103, IFU 110 retrieves instructions included in a second fetch group. The second address corresponds to at least one instruction in the second fetch group. The instructions of the second fetch group are also stored in fetch buffer 111.

Further operations of method 700 may depend on entries in the BTC (block 708). While the second fetch group is being retrieved, BTC 103 may return a hit or miss result for the BTC lookup initiated using the first address. If a BTC entry corresponding to the first address is not found in BTC 103, resulting in a BTC miss, then the method moves to block 710 to wait for prediction results from BPU 102. Otherwise, if the result is a BTC hit, then the method moves to block 712 to retrieve information from the BTC entry.

If a BTC miss resulted from the BTC lookup, then BPU results are used for predicting branch instructions and target addresses (block 710). BPU 102 predicts if a branch instruction is included in the first fetch group based on the first address. If a branch instruction is predicted, then BPU 102 further predicts if the branch will be taken and a target address if the branch is predicted to be taken. In some embodiments, BPU 102 may track a larger number of branch instructions than BTC 103 and may also track more information on the tracked branch instructions than BTC 103. For example, BPU 102 may utilize one or more tables for tracking a history of a given branch instruction taking or not taking an associated branch. Due to the higher complexity, BPU 102 may take more time to produce a result than BTC 103; however, the result may be more accurate than BTC 103. Further instruction fetches may be based on a target address returned by BPU 102. The method ends in block 720.

If a BTC hit resulted from the BTC lookup, then a target addresses and a look-ahead bit are retrieved from the matching BTC entry (block 712). In the illustrated embodiment, the BTC entry that matches the first address is retrieved from BTC 103 and a target address and look-ahead bit are read from the retrieved entry. Both the target address and the look-ahead bit are sent to IFU 110.

A third group of instructions is fetched using the target address (block 714). IFU 110 receives the target address from BTC 103 and uses it to retrieve a third fetch group. The instructions of the third fetch groups may be stored in fetch buffer 111 along with the instructions of the first fetch group and second fetch group.

Continuing operations of method 700 may depend on a value of the look-ahead bit (block 716). In the illustrated embodiment, IFU 110 receives the look-ahead bit and determines if the second fetch group should be flushed based on a value of the look-ahead bit. If the bit is set, indicating that the retrieved BTC entry is a look-ahead BTC entry, then the instructions of the second fetch group are retained in fetch buffer 111 and the method ends in block 720. Otherwise, if the value of the look-ahead bit is clear, indicating that the retrieved BTC entry is a standard BTC entry, then the method moves to block 718 to flush the second fetch group.

If the retrieved BTC entry is a standard BTC entry, then the instructions from the second fetch group are flushed (block 718). IFU 110 flushes the second fetch group from fetch buffer 111. In various embodiments, the instructions may be deleted from fetch buffer 111 or may be marked as empty and then overwritten later when another fetch group is retrieved. The method ends in block 720.

It is noted that the method illustrated in FIG. 7 is merely an example. Operations are illustrated as occurring in a sequential fashion. In other embodiments, however, some of the operations may be performed in parallel or in a different sequence. Additional operations may be included in some embodiments.

Figure 8:
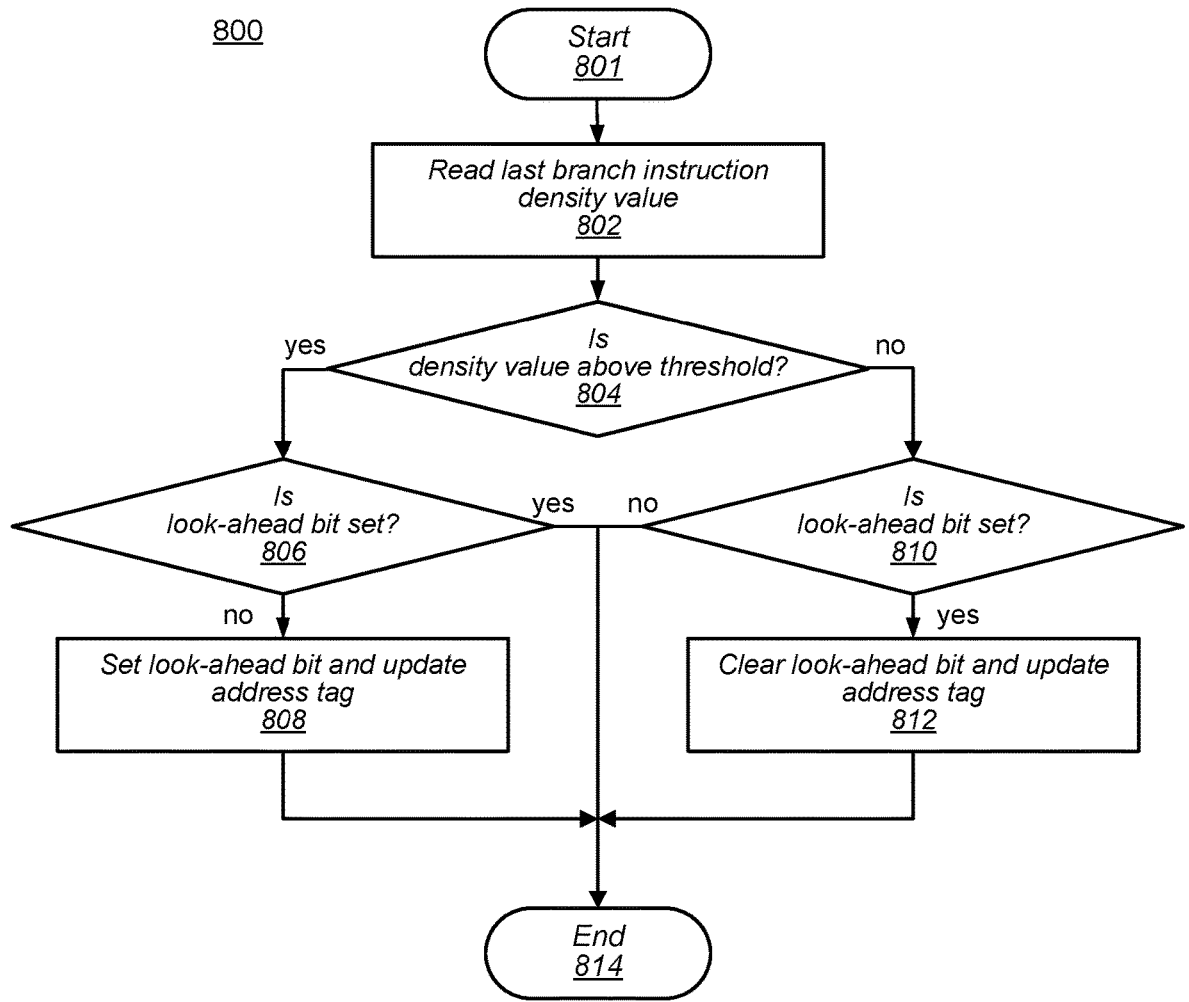
FIG. 8 is a flow diagram showing an embodiment of a method for updating an entry in a Branch Target Cache.

Turning now to FIG. 8, a flow diagram for updating an entry in a Branch Target Cache is illustrated. Operations of method 800 may be applicable to a processing core such as core 100 in FIG. 1, for example. Referring collectively to FIG. 1 and the flowchart of FIG. 8, the illustrated embodiment of the method begins in block 801 after a BTC hit has occurred in BTC 103.

A most recent branch instruction density value is read (block 802). In the illustrated example, the most recent branch instruction density value is read to determine if a current BTC entry corresponding to the BTC hit will be updated. The branch instruction density value is calculated using a method such as, for example, method 600 in FIG. 6. A most recently calculated value is stored and then read upon a BTC hit in BTC 103.

Further operations of method 800 may depend on the branch instruction density value (block 804). The branch instruction density value is compared to a threshold value. In some embodiments, the comparison to the threshold may be made at the end of an interval, and a single bit may be stored to indicate the result of the comparison. If the branch instruction density value is greater than the threshold, then the method moves to block 806 to determine if a standard BTC entry may be converted into a look-ahead BTC entry. Otherwise, the method moves to block 810 to determine if a look-ahead BTC entry may be converted into a standard BTC entry.

If the branch instruction density value is greater that the threshold, then continuing operations may depend on the value of a look-ahead bit (block 806). The look-ahead bit of the current BTC entry is read to determine to determine if the entry may be converted from a standard BTC entry to a look-ahead BTC entry. Since the most recent branch instruction density value is above the threshold value, BTC entries may be generated as look-ahead BTC entries. In addition, existing standard BTC entries that may have been generated while the branch instruction density value was below the threshold value, may now be converted to look-ahead BTC entries. If the current BTC entry is a standard BTC entry (the look-ahead bit is clear), then the method moves to block 808 to convert the current BTC entry. Otherwise, the method ends in block 814.

If the current BTC entry is to be converted to a look-ahead BTC entry, then the corresponding look-ahead bit is set and address tag is updated (block 808). To convert a standard BTC entry to a look-ahead BTC entry, the entry's look-ahead bit is set and a new address tag is generated. The new address tag may be generated using an address from a fetch group that was retrieved prior to the fetch group corresponding to the current BTC entry. The updated address tag and look-ahead bit are stored in the current BTC entry, replacing the previous values. The method ends in block 814.

If the branch instruction density value is less that the threshold value, then continuing operations may again depend on the value of the look-ahead bit (block 810). The look-ahead bit of the current BTC entry is read to determine to determine if the entry may be converted from a look-ahead BTC entry to a standard BTC entry. Since the most recent branch instruction density value is below the threshold value, BTC entries are generated as standard BTC entries. In addition, existing look-ahead BTC entries that may have been generated while the branch instruction density value was greater than the threshold value, may now be converted to standard BTC entries. If the current BTC entry is a look-ahead BTC entry (the look-ahead bit is set), then the method moves to block 812 to convert the current BTC entry. Otherwise, the method ends in block 814.

If the current BTC entry is to be converted to a standard BTC entry, then the corresponding look-ahead bit is cleared and address tag is updated (block 812). To convert a look-ahead BTC entry to a standard BTC entry, the entry's look-ahead bit is cleared and a new address tag is generated. The new address tag is generated using the address from the fetch group corresponding to the current BTC entry. The updated address tag and look-ahead bit are stored in the current BTC entry, replacing the previous values. The method ends in block 814.

It is noted that the method illustrated in FIG. 8 is an example to demonstrate the disclosed concepts. In other embodiments, some operations may be performed in a different sequence. Additional operations may also be included in some embodiments.

Figure 9:
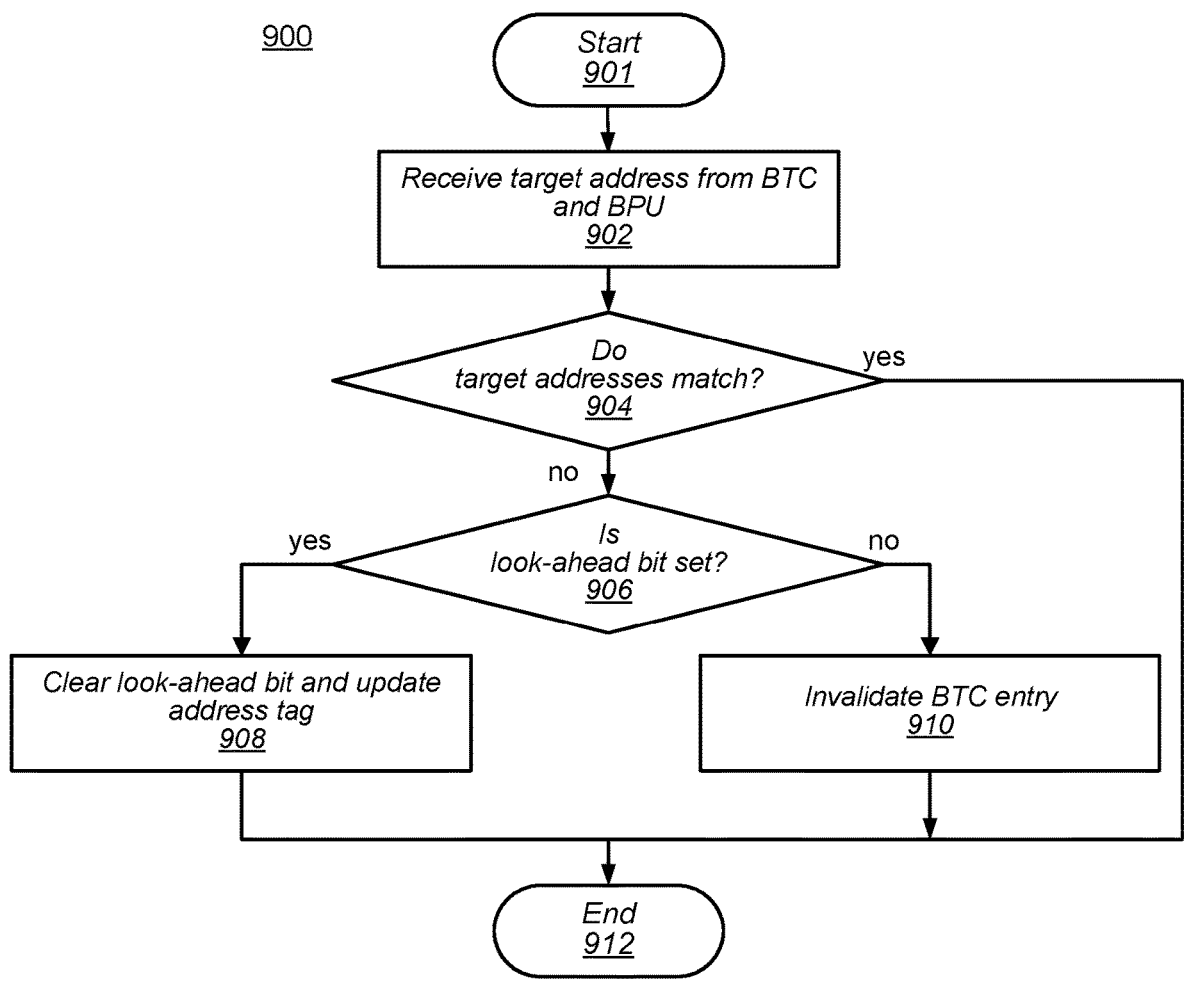
FIG. 9 illustrates a flow diagram of another embodiment of a method for updating an entry in a Branch Target Cache.

Moving now to FIG. 9, a flow diagram for a flow diagram of another embodiment of a method for updating an entry in a branch target cache is shown. Method 900 may also be applicable to a processing core such as, e.g., core 100 in FIG. 1. Referring collectively to FIG. 1 and the flowchart of FIG. 9, method 900 begins in block 901.

Target addresses are received from a branch target cache and a branch prediction unit (block 902). In the illustrated embodiment, a control circuit in branch prediction circuits 101 receives a first target address from BTC 103 in response to a BTC hit initiated for a retrieved fetch group. The first target address, along with a corresponding look-ahead bit, are sent to IFU 110 to retrieve instructions for another fetch group. At some point in time later, BPU 102 returns a second target address corresponding to the retrieved fetch group.

Further operations of the method may depend on the values of the first and second target addresses (block 904). The control logic in branch prediction circuits 101 compares the first target address from BTC 103 to the second target address from BPU 102 to determine if the BTC hit accurately predicted the target address. If the two addresses do not match, then the BTC hit is considered a miss prediction and the method moves to block 906 to determine if the corresponding BTC entry is a look-ahead entry. Otherwise, if the two addresses match, then BTC 103 is considered to have accurately predicted the target address and the method ends in block 912.

Subsequent operations of method 900 may depend on a value of a look-ahead bit (block 906). If the two target addresses did not match, then the look-ahead bit of the corresponding mispredicted BTC entry is read to determine if the entry is a look-ahead BTC entry. If the look-ahead bit is set, then the mispredicted BTC entry is a look-ahead BTC entry and the method moves to block 908 to convert the BTC entry to a standard BTC entry. Otherwise, the mispredicted BTC entry is already a standard BTC entry, then the method moves to block 910 to invalidate the BTC entry.

If the mispredicted BTC entry is to be converted to a standard BTC entry, then the corresponding look-ahead bit is cleared and address tag is updated (block 908). To convert the mispredicted BTC entry from a look-ahead BTC entry to a standard BTC entry, the entry's look-ahead bit is cleared and a new address tag is generated. The new address tag is generated using the address from the fetch group corresponding to the mispredicted BTC entry. The updated address tag and look-ahead bit are stored in the mispredicted BTC entry, replacing the previous values. Converting the BTC to a standard BTC entry may increase the accuracy of the target address prediction of BTC 103 if the corresponding fetch group is retrieved again. The method ends in block 912.

If the look-ahead bit of the BTC entry is clear, then the mispredicted BTC entry is invalidated (block 910). In the illustrated embodiment, if the mispredicted BTC entry is a standard BTC entry, then the entry may be considered inaccurate and, therefore, is invalidated to potentially prevent another misprediction the next time the corresponding fetch group is retrieved. In some embodiments, this operation may be skipped and the mispredicted BTC entry may be used again. In other embodiments, a number of mispredictions for the BTC entry may be tracked, and the BTC entry invalidated after two or more mispredictions. The method ends in block 912.

It is noted that the method illustrated in FIG. 9 is merely an example. Operations are illustrated as occurring in a sequential fashion. In other embodiments, some operations may be performed in a different sequence or in parallel, such as, for example blocks 904 and 906. Additional operations may be included in some embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a branch target cache memory configured to store one or more entries, wherein each entry of the one or more entries includes a respective address tag and a corresponding target address; and
   a control circuit configured to:
      check for at least one taken branch instruction in a first group of one or more instructions fetched using a first address;
      subsequently, check for at least one taken branch instruction in a second group of one or more instructions fetched using a second address, consecutive to the first address, wherein the second group is fetched before determining whether the first group includes a taken branch instruction;
      in response to a determination that the second group includes a particular taken branch instruction, use the first address to generate a particular address tag corresponding to the second group; and
      store the particular address tag and a particular target address associated with the particular taken branch instruction in a particular entry in the branch target cache memory.

2. The apparatus of claim 1, wherein the control circuit is further configured to generate the particular address tag using the first address in response to a determination that a number of taken branch instructions occurring over a period of time is greater than a threshold value, and to otherwise generate the particular address tag using the second address.

3. The apparatus of claim 2, wherein to determine that the number of taken branch instructions occurring over the period of time is greater than the threshold value, the control circuit is further configured to:
   initialize a count value to a starting value at the start of a time period;
   increment the count value in response to each determination that the second group of one or more instructions includes the particular taken branch instruction; and
   compare the count value to the threshold value at the end of the time period.

4. The apparatus of claim 3, wherein the control circuit is further configured to generate the particular address tag using the first address in response to a determination that the count value was greater than the threshold value at the end of a most recent time period.

5. The apparatus of claim 3, wherein the particular entry in the branch target cache memory includes a type bit whose value indicates whether the particular address tag was generated using the first address or the second address.

6. The apparatus of claim 5, wherein the control circuit is further configured to:
   determine that an entry corresponding to the second group exists in the branch target cache memory; and
   generate a replacement address tag using the first address in response to a determination that the count value was greater than the threshold value at the end of a most recent time period and that the type bit in the particular entry indicates that the second address was used to generate the particular address tag.

7. The apparatus of claim 1, wherein the check for the at least one taken branch instruction in the second group of one or more instructions occurs in a consecutive cycle after the check for the at least one taken branch instruction in the first group of one or more instructions.

8. A method, comprising:
checking for at least one taken branch instruction in a first group of one or more instructions fetched using a first address;
subsequently checking for at least one taken branch instruction in a second group of one or more instructions fetched using a second address, consecutive to the first address, wherein the second group is fetched before determining whether the first group includes a taken branch instruction;
in response to a determining that the second group of one or more instructions includes a particular taken branch instruction, using the first address to generate a particular address tag corresponding to the second group; and
storing the particular address tag and a particular target address associated with the particular taken branch instruction in an entry in a branch target cache memory.

9. The method of claim 8, further comprising generating the particular address tag using the first address in response to a determination that a number of taken branch instructions occurring over a period of time is greater than a threshold value, and to otherwise generate the particular address tag using the second address.

10. The method of claim 9, wherein to determine that the number of taken branch instructions occurring over the period of time is greater than the threshold value comprises:
initializing a count value to a starting value at the start of a time period;
incrementing the count value in response to each determination that the second group of one or more instructions includes the particular taken branch instruction; and
comparing the count value to the threshold value at the end of the time period.

11. The method of claim 10, further comprising generating the particular address tag using the first address in response to determining that the count value was greater than the threshold value at the end of a most recent time period.

12. The method of claim 10, further comprising including a type bit in the entry in the branch target cache memory whose value indicates if the particular address tag was generated using the first address or the second address.

13. The method of claim 12, further comprising:
determining that a different entry corresponding to the second group exists in the branch target cache memory; and
generate a replacement address tag using the first address in response to determining that the count value was greater than the threshold value at the end of a most recent time period and that the second address was used to generate the particular address tag.

14. The method of claim 8, wherein using the first address to generate the particular address tag corresponding to the second group includes:
generating a hash value using the first address; and
including the hash value in the particular address tag.

15. A system, comprising:
a branch prediction circuit configured to store one or more entries, wherein each entry of the one or more entries includes a respective address tag, a corresponding target address and a corresponding type bit; and
an instruction fetch unit configured to:
fetch a first group of one or more instructions using a first address; and
subsequently, fetch a second group of one or more instructions using a second address, consecutive to the first address, wherein the second group is fetched before determining whether an entry exists in the branch prediction circuit based on the first address;
wherein the branch prediction circuit is further configured to:
determine that a particular entry exists in the branch prediction circuit based on the first address, wherein the particular entry corresponds to the second group;
using the particular entry, provide, to the instruction fetch unit, a particular target address and a value of a particular type bit;
wherein the instruction fetch unit is further configured to:
subsequently, fetch a third group of one or more instructions using the particular target address provided by the branch prediction circuit; and
keep the second group of one or more instructions in response to a determination that the value of the particular type bit indicates that the particular target address is associated with a taken branch instruction included in the second group, and to otherwise flush the second group of one or more instructions.

16. The system of claim 15, wherein the branch prediction circuit is further configured to:
initialize a count value to a starting value at the start of a time period;
increment the count value in response to each determination that the second group of one or more instructions includes the taken branch instruction; and
compare the count value to a threshold value at the end of the time period.

17. The system of claim 16, wherein the branch prediction circuit is further configured to:
generate a replacement address tag using an address that is older than the first address in response to a determination that the value of the particular type bit indicates that the particular entry is a standard entry, and that the count value was greater than the threshold value at the end of a most recent time period;
store the replacement address tag in the particular entry; and
modify the value of the particular type bit to indicate the particular entry is a look-ahead entry.

18. The system of claim 16, wherein the branch prediction circuit is further configured to:
generate a replacement address tag using the first address in response to a determination that the value of the particular type bit indicates that the particular entry is a look-ahead entry, and that the count value was less than the threshold value at the end of a most recent time period;
store the replacement address tag in the particular entry; and
modify the value of the particular type bit to indicate the particular entry is a standard entry.

19. The system of claim 15, wherein the branch prediction circuit is further configured to:
generate a replacement address tag using the first address in response to a determination that the value of the particular type bit indicates that the particular entry is a look-ahead entry, and that another target address generated in the branch prediction circuit is different than the particular target address;

store the replacement address tag in the particular entry; and modify the value of the particular type bit to indicate the particular entry is a standard entry.

20. The system of claim 15, wherein the branch prediction circuit is further configured to invalidate the particular entry in response to a determination that the value of the particular type bit indicates that the particular entry is a standard entry, and that another target address generated in the branch prediction circuit is different than the particular target address.

\* \* \* \* \*

UNITED STATES PATENT AND TRADEMARK OFFICE
CERTIFICATE OF CORRECTION

| | |
|---|---|
| PATENT NO. | : 10,747,540 B2 |
| APPLICATION NO. | : 15/340106 |
| DATED | : August 18, 2020 |
| INVENTOR(S) | : Chou et al. |

It is certified that error appears in the above-identified patent and that said Letters Patent is hereby corrected as shown below:

In the Specification

In Column 10, Line 34, after "misprediction" insert -- , --.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*